United States Patent

[11] 3,614,563

| [72] | Inventor | George B. Jones |
|---|---|---|
| | | Schenectady, N.Y. |
| [21] | Appl. No. | 769,486 |
| [22] | Filed | Oct. 22, 1968 |
| [45] | Patented | Oct. 19, 1971 |
| [73] | Assignee | General Electric Company |

[54] PLURAL MOTOR TENSION CONTROL FOR A REVERSING INGOT CARRIER SYSTEM
3 Claims, 1 Drawing Fig.

| [52] | U.S. Cl. | 318/7 |
|---|---|---|
| [51] | Int. Cl. | H02p 7/28 |
| [50] | Field of Search | 318/7, 48 |

[56] References Cited
UNITED STATES PATENTS

| 1,931,107 | 10/1933 | Powell | 318/7 |
|---|---|---|---|
| 2,837,705 | 6/1958 | Spuhler | 318/7 |
| 3,079,538 | 2/1963 | Yamashita | 318/7 |
| 3,283,228 | 11/1966 | Asseo | 318/7 |
| 3,370,802 | 2/1968 | Wooldridge | 318/7 |
| 3,117,262 | 1/1964 | Mullin | 318/7 |
| 3,444,445 | 5/1969 | Mullin | 318/7 |

*Primary Examiner*—T. E. Lynch
*Attorneys*—John B. Sponsler, Gerald R. Woods, James C. Davis, Jr, Frank L. Neuhauser, Oscar B. Waddell, Melvin M. Goldenberg and Arnold E. Renner ABSTRACT: A cable-drawn vehicle control wherein the vehicle is arranged to travel between two locations, each location having a motor-operated drum for taking up and supplying lengths of cable, the ends of which are fixed to the vehicle and to the drums with the motors excited from an alternating current source to oppose each other in winding and unwinding the cables. A tachometer is attached to one of the motors for providing a DC speed signal in opposition to a DC speed reference signal of either polarity representing desired speed and direction. A pair of additional DC reference signals having opposing polarity provide a predetermined level of excitation to each of the motors, whereby the tension in the cables maintains the vehicle in stationary condition. With the application of the speed reference signal, additional excitation is applied to one of the motors, causing it to override the other motor and move the vehicle, the speed and direction of which is dependent on the magnitude and polarity of the desired speed reference signal.

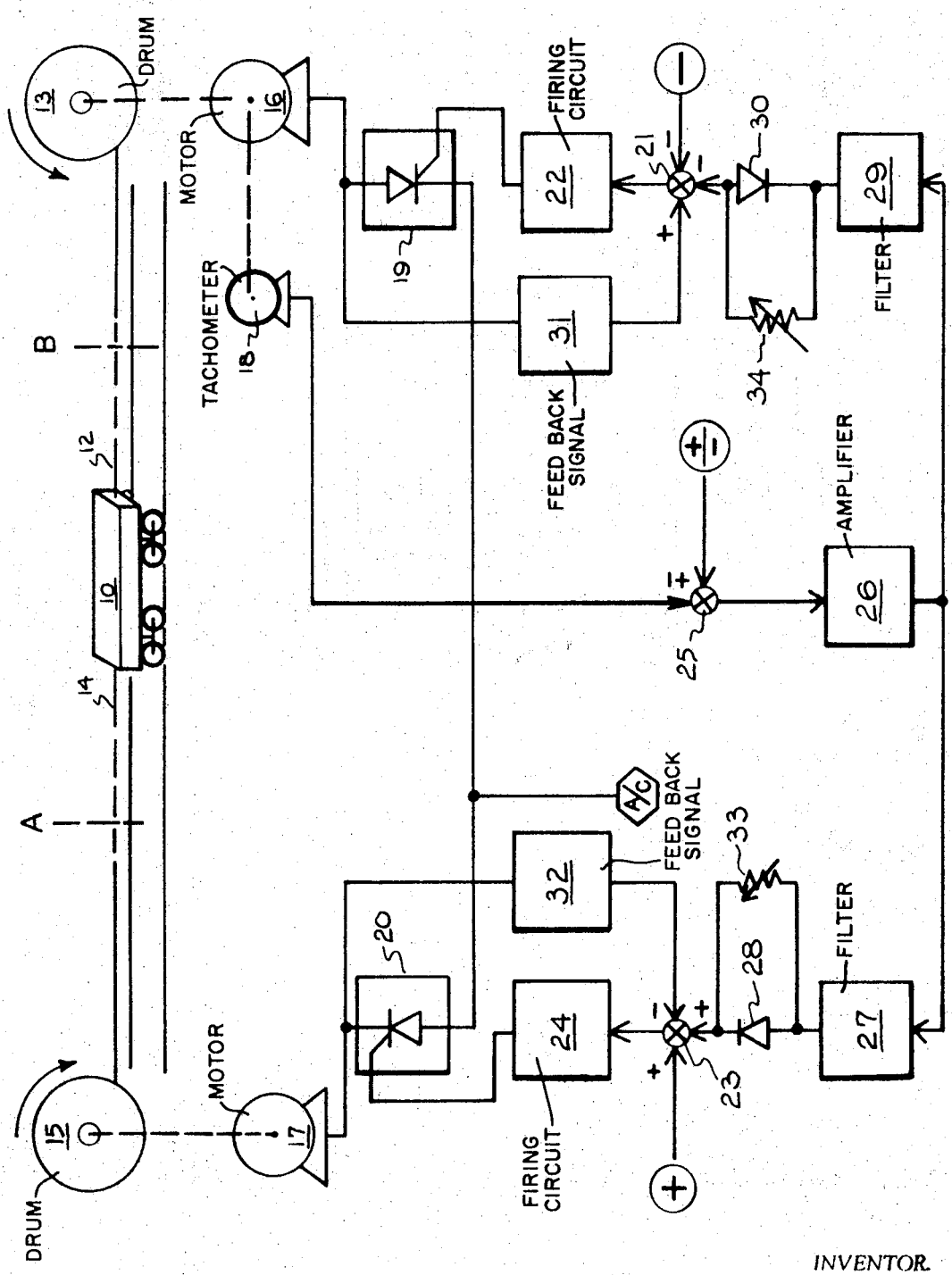

PLURAL MOTOR TENSION CONTROL FOR A REVERSING INGOT CARRIER SYSTEM

BACKGROUND OF THE INVENTION

In metals processing it is frequently necessary to transport heavy ingots having very high temperatures from furnaces to mill equipment, precisely positioning such masses into the latter. Customarily an ingot weighing in the hundreds of tons is carried by a small, sturdy cart, or "buggy," having cables attached at each end which are wound and unwound upon drums at each extremity of the travel of the cart, the cables being held taut between the drums and the cart by opposingly driven DC motors, one motor overcoming the torque exerted by the other motor when the cart is to be moved.

Previously in order to provide the control of drum motors in equipment of this type, each motor was provided with a separate, equivalent DC generator for supplying its electrical power, sometimes referred to as a "booster" generator. These generators provide equalizing power sources for the opposing motors so that the force tending to pull the cart in one direction is exactly offset by the force tending to pull the cart in the opposite direction; i.e., a "stall" condition. In addition a third generator is provided having the capability of reversing the polarity of its output, which is applied to one or the other of the "booster" generators in order to increase the amount of power available to its corresponding motor, which is thereby actuated, overcoming the force exerted by the other motor, to move the cart in a predetermined direction accordingly. When the polarity of the third generator is reversed, the movement of the cart is reversed in a similar manner. The third generator may be applied to the system either electrically, or by switching per se.

SUMMARY OF THE INVENTION

The present invention is directed to providing a source of power supply to a reversing motor drive system wherein each of a pair of reversingly controlled, opposing motors is supplied with power from an AC source under integrated control of solid state rectifiers, thereby eliminating any need for rotating machinery to provide a power supply.

BRIEF DESCRIPTION OF THE DRAWING

The drawing is a diagrammatic line oriented sketch showing the arrangement of the solid-state power supply and controls for regulating the travel of an ingot carrier under reversible operation by opposing motors.

PREFERRED EMBODIMENT OF THE INVENTION

In the drawing a cart 10 is illustrated having a cable 12 connected to one of its ends, the other end of the cable being attached to a drum 13 about which the cable may be wound or unwound. Similarly the other end of the cart 10 is connected to a cable 14, the other end of the cable being attached to a drum 15 about which the cable 14 may be wound or unwound. The cart 10 may be used for transporting a heavy object such as a hot steel ingot from a location such as "A," which might be a furnace, to another location "B" corresponding to the input of a rolling mill.

The drum 13 is rotated by a direct current motor 16 and the drum 15 by another similar direct current motor 17, a tachometer 18 being connected mechanically to the motor 16. The direction of rotation of the motor 16 is such as to turn its drum 13 counterclockwise and similarly the direction of rotation of the motor 17 tends to turn its drum 15 clockwise. As a result the cables 12 and 14 are pulled taut and the cart 10 normally remains stationary unless the torque of one of the motors 16 or 17 exceeds that of the other whereupon the cart is moved in the direction of the motor exerting the greater torque.

Electrical power is supplied to the motors 16 and 17, respectively, by controlled silicon rectifiers 19 and 20 from a source of alternating current AC. The control of the rectifiers 19 and 20, therefore, determines the amounts of power delivered to these motors by their respective rectifiers, as well as the magnitude and direction of the torques of these motors applied to their coacting cable drums.

Referring again to the drawing, normally the stabilized condition of the system, whereby each motor 16 and 17 tends to pull the cart 10 in the opposite direction via the drums 13 and 15 with the cart 10 remaining motionless, is brought about by a negative reference signal applied to terminal 21, a summing junction, whereby a firing circuit 22 energizes the control element of the rectifier 19 to provide power to motor 16, and coincident therewith a positive reference signal applied to terminal 23, another summing junction, whereby a firing circuit 24 energizes the control element of rectifier 20 to provide an equal amount of power to motor 17. The control of the rectifiers 19 and 20 includes feedback signals 31 and 32 which are applied to summing junctions 21 and 23 in opposition to the respectively negative and positive reference signals.

Let it be assumed that the cart 10 is at position "B" and it is desired to cause it to be moved to position "A." A positive signal is applied to terminal 25, another summing junction, through an amplifier 26, a filter 27 and a diode 28 to junction 23 whereby the firing circuit 24 increases the amount of power delivered by rectifier 20 to motor 17 causing the drum 15 to rotate clockwise, the cable 14 to be wound upon the drum, and the cart 10 to be pulled in the direction of location "A." It is to be noted that while the positive signal applied to junction 25 and through amplifier 26 is also applied through a filter 29 to a diode 30, the latter (disregarding a variable resistor 34, the action of which will be explained later) prohibits the positive signal from reaching junction 21; consequently, the power delivered to motor 16 remains unchanged so that the drum 13 via cable 12 is turned against the torque provided by motor 16 in view of the greater torque now exerted by motor 17. Motor 16, being rotated in this manner, causes feedback signal 31 to increase in the positive direction. This signal, when fed into summing junction 21 in opposite to the negative reference input signal, causes a more positive input to be applied to the firing circuit 22 resulting in a decrease in power delivered by silicon controlled rectifier 19 to motor 16. As speed increases, current generated by the motor increases resulting in a corresponding decrease in power delivered by silicon controlled rectifier 19. Nevertheless, the cable 12 will be held taut by the counter torque of motor 16 through the drum 13. When the cart 10 arrives at location "A" the positive signal is removed, and the cart remains at location "A" under the normal conditions previously explained.

Similarly, the cart 10 may be moved from location "A" to location "B" by applying a negative signal to junction 25, amplifier 26, filter 29, diode 30 to junction 21 whereby the torque of motor 16 via increased power from rectifier 19 causes the drum 13 to rotate counterclockwise to wind its cable 12 against the pull of cable 14 unwinding from drum 15 under the influence of the counter torque of motor 17.

The tachometer 18, which provides a control signal to junction 25 of a polarity opposite to that applied externally to junction 25, is connected to either of the motors 16 or 17, the tachometer output polarity being reversed according to which direction the motor is rotating. This provides a type of speed regulation tending to stabilize operation as the speed of either motor increases. A further negative feedback is also provided for each control facet of the system by the feedbacks 31 and 32, respectively, in order to limit the maximum output of the rectifiers 19 and 20, feedback 31 always delivering positive signals to junction 21 and feedback 32 always delivering negative signals to junction 23. The filters 27 and 29 are provided to smooth the tachometer signals and other extraneous interference.

The variable resistors 33 and 34 also function in the control of the system to provide inertial control. For example, when a positive signal is applied to junction 25 it is normally blocked from junction 21 (which continually carries a negative signal, as previously explained); however, the variable resistor 34 may be regulated to permit some of the positive signal into junction 21 thereby reducing the power delivered to motor 16 so that motor 17 can more quickly pick up the inertia of the cart 10 and the cables 12 and 14.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A bidirectional control system for the speed regulation of two electrical motors each of which is coupled to a common load, comprising:
   a. a source of alternating current;
   b. a first silicon controlled rectifier for conducting the positive portion of said alternating current from said source to the first of said motors;
   c. a second silicon controlled rectifier for conducting the negative portion of said alternating current from said source to the second of said motors;
   d. first and second means for controlling the firing angle of said first and second silicon controlled rectifiers respectively;
   e. means for applying a positive reference signal to said first firing angle controlling means;
   f. means for applying a negative reference signal to said second firing angle controlling means;
   g. means for supplying a third reference signal, the polarity of which may be selectively varied between positive and negative values;
   h. means responsive to the speed and direction of the motors for producing a feedback signal;
   i. means for combining said third reference signal and said speed feedback signal to form a control signal which varies from a predetermined maximum value to a predetermined minimum value as a function of speed; and,
   j. means responsive to the polarity of said control signal for selectively applying said control signal to one of said first and second firing angle controlling means, in conjunction with the respective positive and negative reference signals whereby the speed of the motors is maintained at a level proportional to the value of said reference signal.

2. The invention claimed in claim 1 wherein the means responsive to the polarity of the reference signal, comprises:
   a. a first rectifier connected to said first firing angle controlling means for conducting only positive polarity signals, and
   b. a second rectifier connected to said second firing angle controlling means for conducting only negative polarity signals.

3. The invention claimed in claim 2 further including first and second adjustable resistive means connected respectively in parallel with said first and second rectifiers for allowing a signal proportional to said control signal to bypass either of the rectifiers while conducting whereby the inertia of the respective motor is compensated.